United States Patent
Duluk, Jr. et al.

(10) Patent No.: US 9,965,321 B2
(45) Date of Patent: May 8, 2018

(54) ERROR CHECKING IN OUT-OF-ORDER TASK SCHEDULING

(75) Inventors: Jerome F. Duluk, Jr., Palo Alto, CA (US); Timothy John Purcell, Provo, UT (US); Jesse David Hall, Santa Clara, CA (US); Philip Alexander Cuadra, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 8 days.

(21) Appl. No.: 13/316,344

(22) Filed: Dec. 9, 2011

(65) Prior Publication Data
US 2013/0152094 A1    Jun. 13, 2013

(51) Int. Cl.
*G06F 9/46* (2006.01)
*G06F 9/48* (2006.01)

(52) U.S. Cl.
CPC .................................. *G06F 9/4843* (2013.01)

(58) Field of Classification Search
None
See application file for complete search history.

(56) References Cited

U.S. PATENT DOCUMENTS

| | | | | |
|---|---|---|---|---|
| 6,854,116 B1* | 2/2005 | Anderson | ............. | G06F 9/4887 718/100 |
| 7,634,637 B1* | 12/2009 | Lindholm | ............. | G06F 9/3851 712/13 |
| 7,697,007 B1* | 4/2010 | Duluk, Jr. | ............. | G06F 9/4843 345/502 |
| 7,861,060 B1* | 12/2010 | Nickolls | ................. | G06F 9/522 712/22 |
| 2009/0251476 A1* | 10/2009 | Jiao | ......................... | G06F 9/383 345/543 |
| 2010/0293353 A1* | 11/2010 | Sonnier | ................. | G06F 15/167 711/170 |
| 2012/0017221 A1* | 1/2012 | Hankins | ............. | G06F 11/3466 719/318 |

* cited by examiner

*Primary Examiner* — Van H Nguyen
*Assistant Examiner* — Melissa A Alfred
(74) *Attorney, Agent, or Firm* — Artegis Law Group, LLP (57) ABSTRACT

One embodiment of the present invention sets forth a technique for error-checking a compute task. The technique involves receiving a pointer to a compute task, storing the pointer in a scheduling queue, determining that the compute task should be executed, retrieving the pointer from the scheduling queue, determining via an error-check procedure that the compute task is eligible for execution, and executing the compute task.

24 Claims, 5 Drawing Sheets

ERROR CHECKING IN OUT-OF-ORDER TASK SCHEDULING

BACKGROUND OF THE INVENTION

Field of the Invention

The present invention generally relates to execution of compute tasks and, more specifically, to error-checking compute tasks immediately prior to their execution.

Description of the Related Art

Conventional execution of compute tasks in multiple processor systems involves receiving processing tasks from a stream of commands that encode state information for configuring the multiple processors interleaved with data to be processed, where the data is processed in the order that the data appears in the stream. In particular, data that comprises a compute task is received, error-checked by an error-checking component, and then queued for execution.

Importantly, a proliferation in the implementation of out-of-order execution of compute tasks is occurring. One technique for implementing out-of-order execution of compute tasks involves receiving pointers to data objects that comprise compute tasks, as opposed to receiving all of the data that comprises the compute tasks as in conventional methods. Thus, implementing the conventional method of error-checking compute tasks upon receipt would involve receiving a memory pointer to data that comprises a compute task, reading the data from the memory, error-checking the data, and then queuing the pointer for out-of-order execution. Subsequently, when the compute task pointer is removed from the queue for execution, the data referred to by the pointer must be re-read from memory, which is redundant and inefficient.

Accordingly, what is needed in the art is a system and method for a more efficient way of error-checking compute tasks in out-of-order execution implementations.

SUMMARY OF THE INVENTION

One embodiment of the present invention sets forth a method for error-checking a compute task. The method includes the steps of receiving a pointer to a compute task, storing the pointer in a scheduling queue, determining that the compute task should be executed, retrieving the pointer from the scheduling queue, determining via an error-check procedure that the compute task is eligible for execution, and executing the compute task.

One advantage of the disclosed method is that compute task data is not redundantly read from memory in order to perform the error-checking procedure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
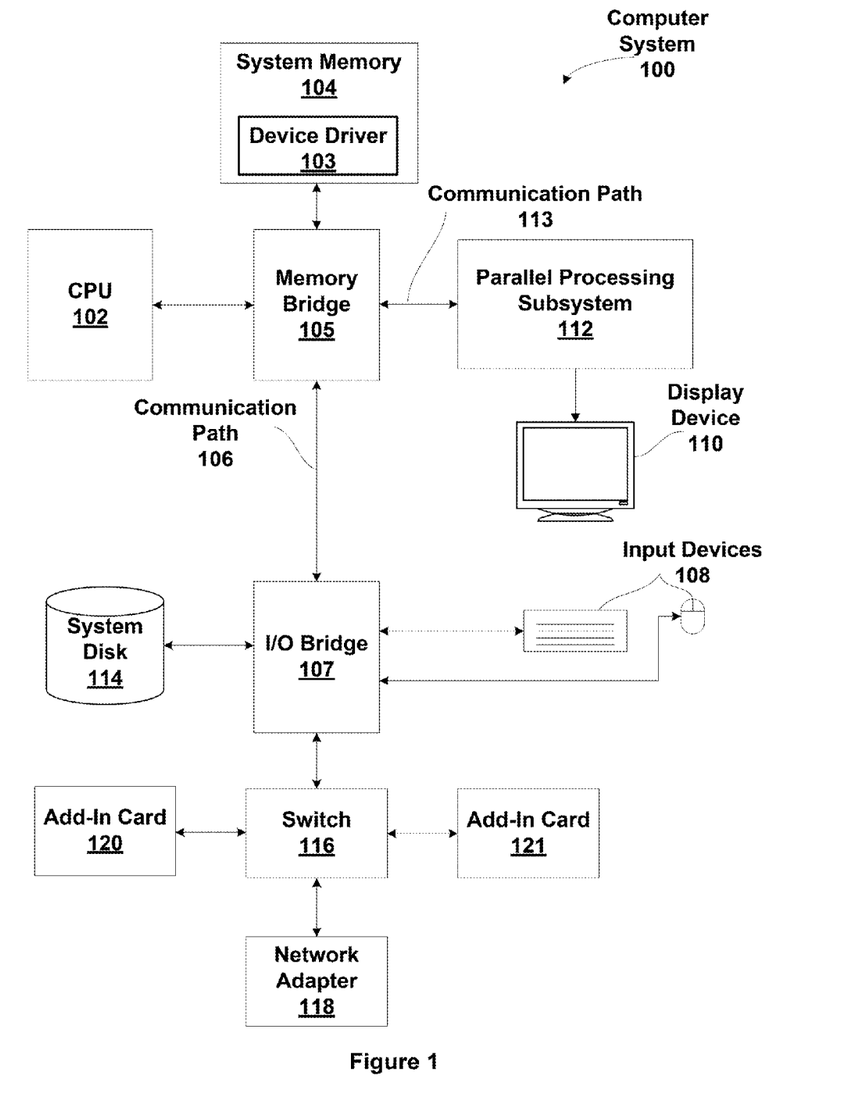
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
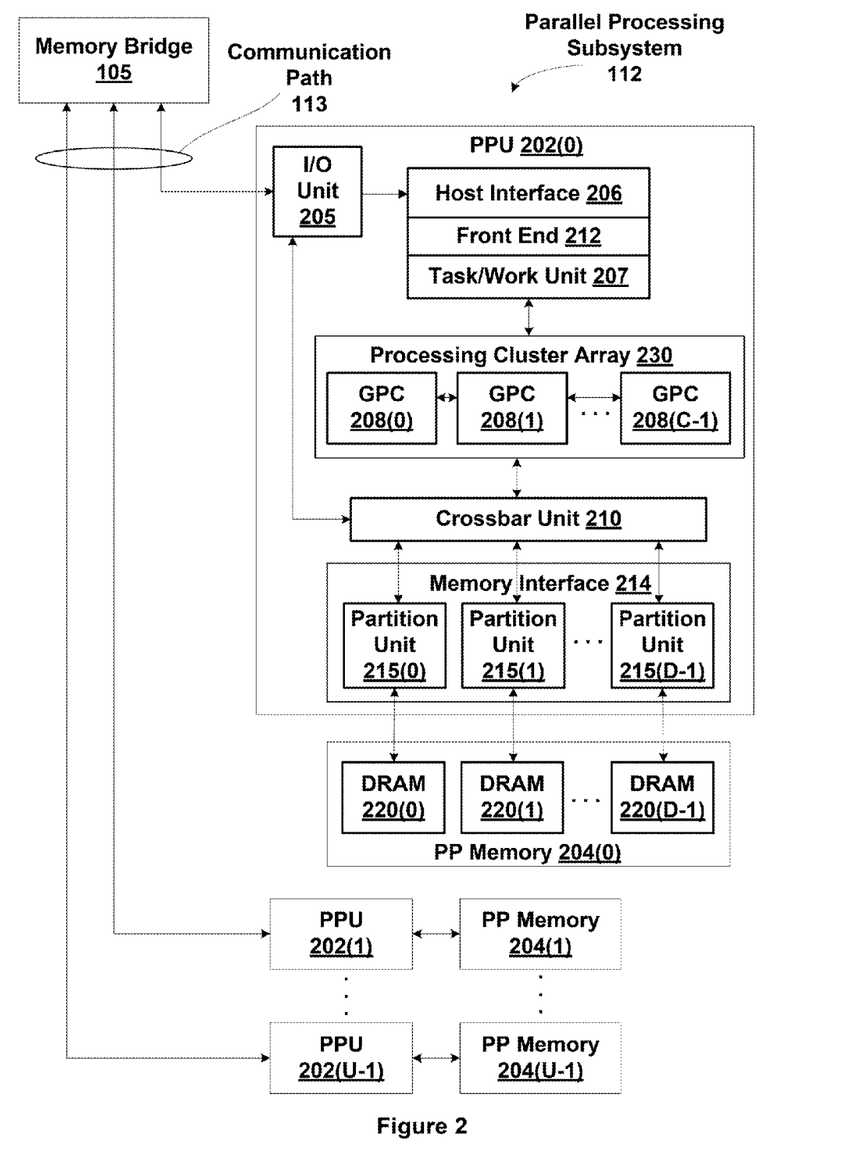
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer to control scheduling of the different pushbuffers.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to compute processing tasks (task pointers) that are encoded as task metadata (TMD) and stored in memory. The task pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices.

Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more dynamic processing tasks during execution. The task/work unit 207 receives the tasks and dynamically schedules the processing tasks and dynamic processing tasks for execution by the GPCs 208.

Figure 3:
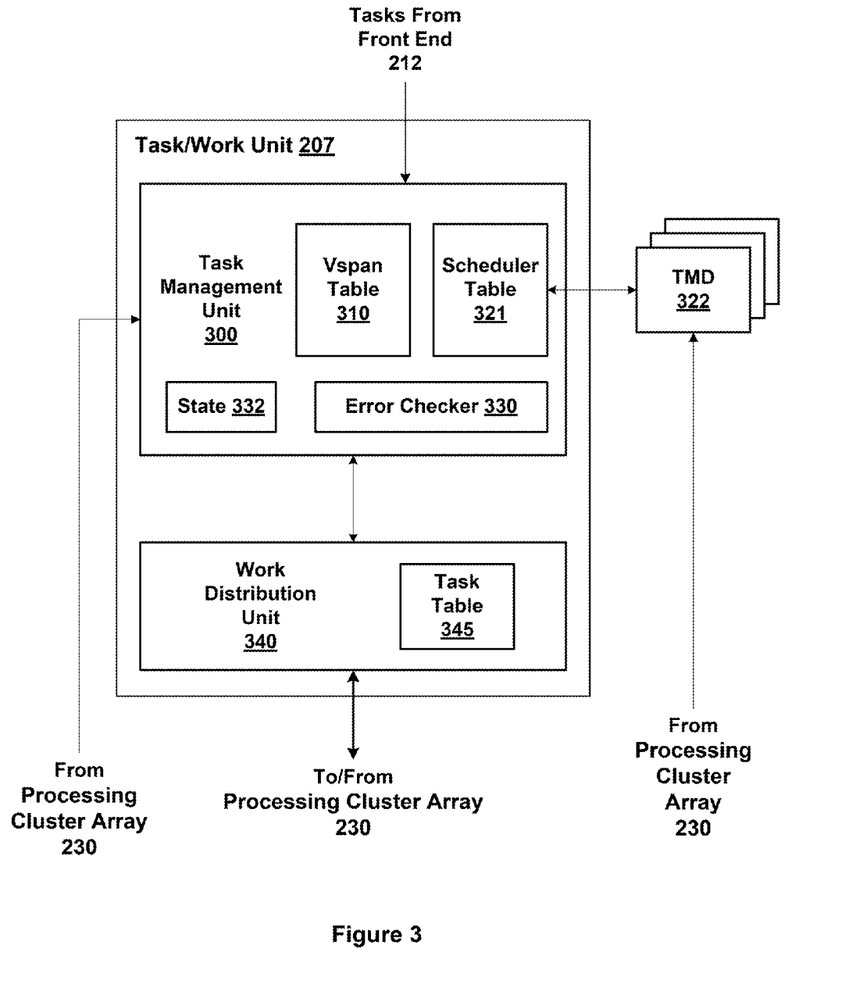
FIG. 3 is a block diagram of the Task/Work Unit of FIG. 2, according to one embodiment of the invention.

FIG. 3 is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of task pointers to the TMDs 322 corresponding to the tasks in the scheduler table 321, where the list can be implemented with a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques. The task management unit 300 also includes a vspan table 310 that is configured to coalesce data that is dynamically generated and written to a queue of a TMD 322 for a dynamic task. Also included in the task management unit 300 is an error checker 330, which is configured to error check TMDs 322 prior to their execution. Further included in the task management unit 300 is a state module 332, which stores configuration data that may be referenced by error checker 330 when performing particular error checks of a TMD 322.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution the task is not complete, the task is added to a linked list in the scheduler table 321. When a dynamic processing task is generated, the dynamic task is added to a linked list in the scheduler table 321. A dynamic task may be generated by a TMD 322 executing in the processing cluster array 230. A task is removed from a slot when the task is evicted.

Persons skilled in the art will understand that the architecture described in FIGS. 1, 2, and 3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Task Scheduling and Management

The task management unit 300 manages compute tasks to be scheduled as an array of TMD groups that are stored in the scheduler table 321. A TMD group is a set of compute tasks with the same scheduling priority. The number of TMD groups, or priority levels, may be one or more. Within each TMD group, the compute tasks at the respective priority level are stored in a list, which can be implemented with a linked list, and hereinafter a linked list is assumed. Each TMD in a linked list stores a pointer to the next TMD in the respective linked list. A head pointer and a tail pointer for the linked list are stored for each TMD. A TMD group having no tasks has a head pointer that equals the tail pointer and an empty bit is set TRUE.

When compute tasks are received from the host interface 206, the task management unit 300 inserts the compute tasks into a TMD group. More specifically, a task pointer to the TMD corresponding to the compute task is added to the tail of the linked list for that group unless a special TMD bit is set which causes the task to be added to the head of the linked list. Even though all tasks within a TMD group have the same scheduling priority level, the head of the TMD group linked list is the first compute task that is selected by the task management unit 300 and scheduled for execution. Thus, the compute task at the head of the linked list has a relatively higher priority compared with other compute tasks at the same priority level. Similarly, each successive compute task in the linked list at the same priority level as a lower priority relative to preceding compute tasks in the linked list. Therefore, the task management unit 300 is able to schedule the compute tasks within a TMD group in input order relative to one another (assuming none are specially marked to add to the head of the TMD group). Since the TMD group is specified as part of the TMD structure, the TMD group of a compute task cannot be changed while the compute task is being executed. Compute tasks can also be received from the processing cluster array 230.

The collection of compute tasks into groups based on priority levels prior to scheduling the compute tasks allows for a decoupling of the rate at which compute tasks are received by the task management unit 300 from the rate at which compute tasks are output to the work distribution unit 340 for execution. The task management unit 300 is generally able to accept compute tasks from one or more pushbuffers output by the host interface 206 at a faster rate than the compute tasks may be output for execution by the work distribution unit 340. The input from the different pushbuffers are independent streams, typically generated by the same application program in order to have multiple sets of dependent tasks, but in some embodiments, multiple application programs can write to the pushbuffers. The task management unit 300 may be configured to buffer the compute tasks in the schedule table 321 and later select one or more compute tasks from the scheduler table 321 for output to the work distribution unit 340. By selecting the compute tasks after they are buffered, the task management unit may make the selection based on more information compared with selecting a compute task as compute tasks are received. For example, the task management unit 300 may buffer several low-priority tasks that are received before a high-priority task. The buffering enables the task management unit 300 to select the high-priority task for output before the low-priority tasks.

The task management unit 300 may perform selection to schedule the compute tasks using several different techniques: round-robin, priority, or partitioned priority scheduling. For each of the different scheduling techniques, when a compute task is selected to be scheduled, the selected compute task is removed from the group in which the selected compute task is stored. Regardless of the scheduling technique, the task management unit 300 is able to quickly select a compute task by selecting the first entry in the linked list of the appropriate group. Therefore, the compute tasks may be scheduled and/or executed in an order that is different than the order in which the task pointers are received by the task management unit 300 from the host interface 206.

The simplest scheduling scheme is for the task management unit 300 to schedule the compute task at the head of each group (if a compute task exists in the group) and rotate through the groups in round-robin order. Another scheduling technique is priority scheduling that selects the compute tasks in strict priority order. The task management unit 300 selects a compute task from the highest priority group that has at least one compute task, starting at the head of the group.

Compute Task State Encapsulation

Figure 4A:
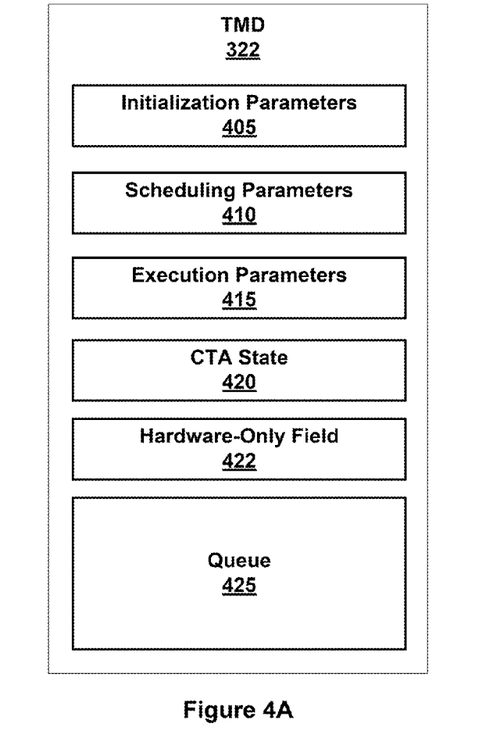
FIG. 4A is a conceptual diagram of the contents of a TMD of FIG. 3, according to one embodiment of the invention.

FIG. 4A is a conceptual diagram of the contents of a TMD 322 that is stored in PP memory 204, according to one embodiment of the invention. The TMD 322 is configured to store initialization parameters 405, scheduling parameters 410, execution parameters 415, cooperative thread array (CTA) state 420, a hardware-only field 422, and a queue 425. The hardware-only field 422 stores the hardware-only portion of the TMD 322, which comprises one or more hardware-only parameters. State that is common to all TMDs 322 is not included in each TMD 322. Because a TMD 322 is a data structure that is stored in PP memory 204, a compute program running on the CPU 102 or PPU 112 can create a TMD 322 structure in memory and then submit the TMD 322 for execution by sending a task pointer to the TMD 322 to the task/work unit 207.

The initialization parameters 405 are used to configure the GPCs 208 when the TMD 322 is launched and may include the starting program address and size of the queue 425. Note that the queue 425 may be stored separately from the TMD 322 in memory in which case the TMD 322 includes a pointer to the queue 425 (queue pointer) in place of the actual queue 425.

The initialization parameters 405 may also include bits to indicate whether various caches, e.g., a texture header cache, a texture sampler cache, a texture data cache, data cache, constant cache, and the like, are invalidated when the TMD 322 is launched. A bit indicating whether texture samplers are linked one-to-one with texture headers may also be included in the initialization parameters 405. Initialization parameters 405 may also include a dimensions of a CTA in threads, a TMD version number, an instruction set version number, dimensions of a grid in terms of CTA width, height, and depth, memory bank mapping parameters, depth of a call stack as seen by an application program, and a size of the call-return stack for the TMD. The initialization parameters 405 may include a size of a constant buffer, an address of the constant buffer, a bit indicating that a constant buffer bind is valid, and a bit indicating that the data from the constant buffer is invalidated in the cache before the TMD is launched may be stored in the initialization parameters 405.

Finally, the initialization parameters 405 may include several parameters related to the amount of memory available for each thread of a CTA. When a TMD 322 needing multiple CTAs that each require large amounts of shared memory are ready to be scheduled for execution, the task/work unit 207 may limit (i.e., throttle) the number of CTAs that execute concurrently so the CTAs do not attempt to consume more memory than is available for access by the TMD 322. Examples of parameters related to the amount of memory available for each thread of a CTA include a size of one or more local memory regions, a number of registers, size of memory that may be directly addressed by the TMD 322 through an L1 cache, an amount of shared memory for a single CTA, and a number of barrier operations for each CTA.

The scheduling parameters 410 control how the task/work unit 207 schedules the TMD 322 for execution. The scheduling parameters 410 may include a bit indicating whether the TMD 322 is a queue TMD or a grid TMD. If the TMD 322 is a grid TMD, then the queue feature of the TMD 322 that allows for additional data to be queued after the TMD 322 is launched is unused, and execution of the TMD 322 causes a fixed number of CTAs to be launched and executed. The number of CTAs is specified as the product of the grid width, height, and depth.

If the TMD 322 is a queue TMD, then the queue feature of the TMD 322 is used, meaning that data are stored in the queue 425, as queue entries. Queue entries are input data to CTAs of the TMD 322. The queue 425 may be implemented as a circular queue so that the total amount of data is not limited to the size of the queue 425. As previously described, the queue 425 may be stored separately from the TMD 322 and the TMD 322 may store a queue pointer to the queue 425. Advantageously, queue entries may be written to the queue 425 while the TMD is executing.

A variable number of CTAs are executed for a queue TMD, where the number of CTAs depends on the number of entries written to the queue 525 of the TMD queue. The scheduling parameters 510 for a queue TMD also include the number of entries (N) of queue 525 that are processed by each CTA. When N entries are added to the queue 525, one CTA is launched for the TMD 322. The task/work unit 207 may construct a directed graph of processes, where each process is a TMD 322 with a queue. The number of CTAs to be executed for each TMD 322 may be determined based on the value of N for each TMD 322 and the number of entries that have been written in the queue 525.

The scheduling parameters 410 of a queue TMD may also comprise a coalesce waiting time parameter that sets the amount of time that is waited before a CTA is run with less than N queue entries. The coalesce waiting time parameter is needed when the queue is almost empty, but an insufficient number of queue entries is present, which can arise when the total number of queue entries over the course of execution is not evenly divisible by N. The coalesce waiting time parameter is also needed for the case of producer-consumer queues, in order to avoid deadlock. For the case of a CTA being executed with fewer than N entries, the number of queue entries is passed as a parameter to the TMD's program, so that the number of entries can be taken into account during execution.

Alternate embodiments may have different structures for a grid TMD and a queue TMD, or implement only either grid TMDs or queue TMDs. The scheduling parameters 410 of the TMD 322 may include a bit indicating whether scheduling the dependent TMD also causes TMD fields to be copied to the hardware-only field 422. The scheduling parameters 410 may also include the TMD group ID, a bit to indicate where the TMD 322 is added to a linked list (head or tail), and a pointer to the next TMD 322 in the TMD group. The scheduling parameters 410 may also include masks that enable/disable specific streaming multiprocessors within the GPCs 208.

A TMD 322 may include a task pointer to a dependent TMD that is automatically launched when the TMD 322 completes. Semaphores may be executed by the TMDs 322 to ensure that dependencies between the different TMDs 322 and the CPU 102 are met. For example, the execution of a first TMD 322 may depend on a second TMD completing, so the second TMD generates a semaphore release, and the first TMD executes after the corresponding semaphore acquire succeeds. In some embodiments, the semaphore acquire is performed in the host interface 206 or the front end 212. The execution parameters 415 for a TMD 322 may store a plurality of semaphore releases, including the type of memory barrier, address of the semaphore data structure in memory, size of the semaphore data structure, payload, and enable, type, and format of a reduction operation. The data structure of the semaphore may be stored in the execution parameters 415 or may be stored outside of the TMD 322.

The execution parameters 415 may also include the starting address of the program to be executed for the TMD 322, the type of memory barrier operation that is performed when execution of the TMD 322 completes, a serial execution flag indicating whether only a single CTA is executed at a time (serially) for the TMD 322, and a throttle enable flag that controls whether or not the task/work unit 207 may limit the number of CTAs running concurrently based on the memory limitations specified for the TMD 322.

The execution parameters 415 also store various flags that control behaviors of arithmetic operations performed by the processing task that is executed for the TMD 322, e.g., not-a-number (NaN) handling, float-to-integer conversion, and rounding modes of various instructions.

The CTA state 420 for the TMD 322 may include an ID of a reference counter used by the TMD 322, an enable for incrementing the reference counter, and a separate enable for decrementing the reference counter. When a process is preempted, processing of the TMD 322 may be stopped at an instruction boundary or a CTA boundary and identification of the CTA at which processing will be resumed is stored in the CTA state 420. The state information needed to resume execution of the TMD 322 after preemption may be stored in the CTA state 420, or in a separate area in PP memory 204, or in system memory 104.

The CTA state 420 also stores data pointers to entries of the queue 425 and counter overflow flags indicating when each data pointer increments past the end of the queue 425 and needs to wrap back to the start of the queue 425. Hardware-only versions of one or more of the data pointers and the scheduling flag may be stored in the hardware-only field 422.

Figure 4B:
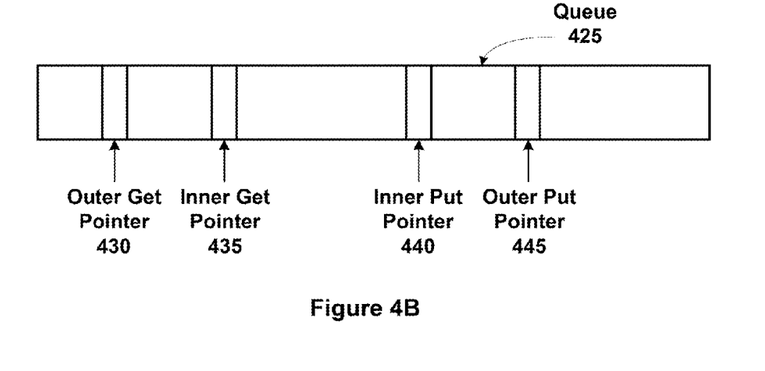
FIG. 4B illustrates pointers to entries of the queue of FIG. 4A, according to one embodiment of the invention.

FIG. 4B illustrates data pointers to entries of the queue 425 of FIG. 4A, according to one embodiment of the invention. Writing data for a processing task encoded in the queue 425 is decoupled from the allocation of entries in the queue 425. First a process reserves or allocates a number of entries in the queue 425 and later, the process stores the data to be processed by the CTAs in the entries. An outer put pointer 445 points to the next available entry in the queue 425 to be allocated and an inner put pointer 440 points to the oldest entry in the queue 425 that has been allocated and not yet written. The entries are not necessarily written in the order in which the entries are allocated, so there may be entries between the inner put pointer 440 and the outer put pointer 445 that have been written.

An outer get pointer 430 points to the oldest entry of the queue 425 that stores data that has been assigned to a CTA for processing, i.e., a CTA that will process the data has been launched but the CTA has not read the data yet. An inner get pointer 435 points to the newest entry of the queue 425 that has been assigned to a CTA for processing. Data that have been written to the queue 425, but not yet assigned to a CTA for processing are stored in the entries between the inner get pointer 435 and the inner put pointer 440. Data that have been assigned to a CTA for processing and not read are stored between the outer get pointer 430 and the inner get pointer 435.

Figure 5:
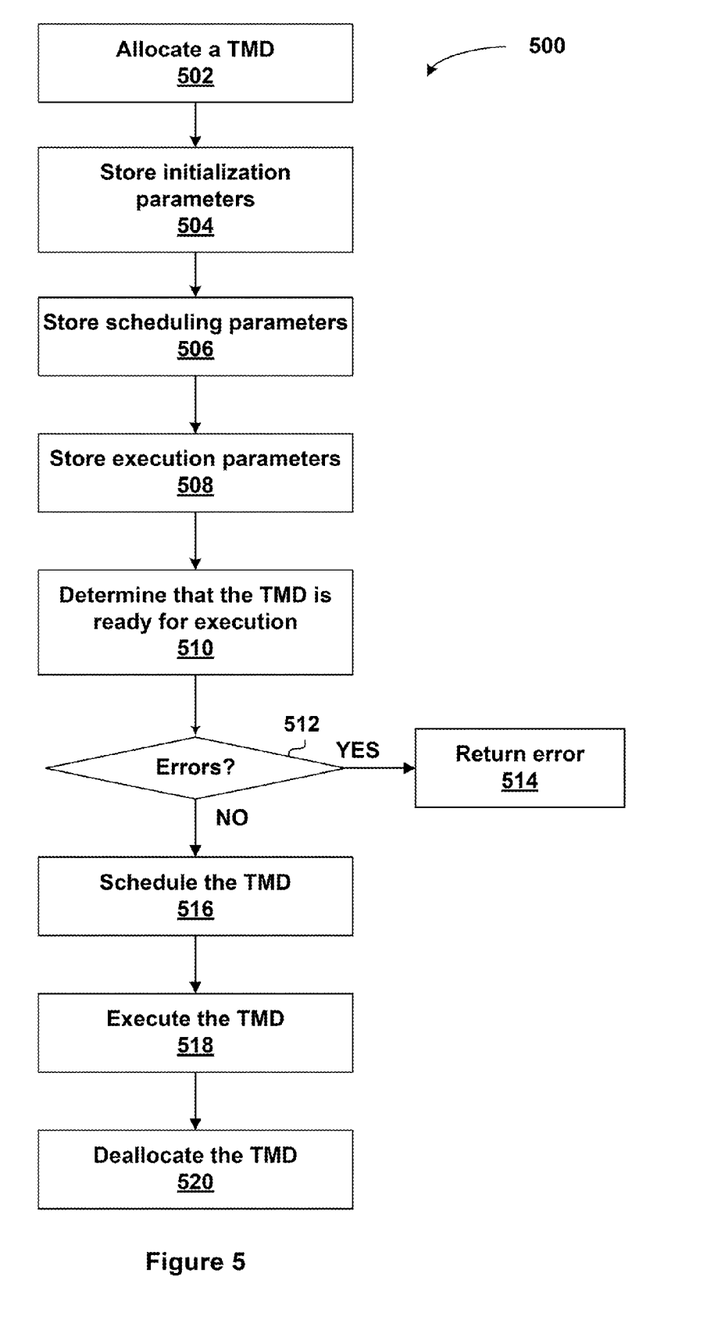
FIG. 5 illustrates a method for error-checking a compute task in a grid TMD of FIGS. 3 and 4A-4B, according to one embodiment of the invention.

FIG. 5 illustrates a method for error-checking a compute task in a TMD of FIGS. 3 and 4A-4B, according to one embodiment of the invention. Although the method steps are described in conjunction with the systems of FIGS. 1-3, persons skilled in the art will understand that any system configured to perform the method steps, in any order, is within the scope of the inventions.

At step 502 a TMD 322 is allocated, i.e., memory in which to store the TMD 322 data is allocated. At step 504 the initialization parameters 405 are stored in the TMD 322. At step 506 the scheduling parameters 410 are stored in the TMD 322. At step 508 the execution parameters 415 are stored in the TMD 322. At step 510, the task/work unit 207 determines that the TMD 322 is ready for execution. At step 512, the error checker 330 included in the task management unit 300 determines whether there are any errors associated with the TMD 322.

One example of an error includes the case where the TMD 322 is configured to allocate a preset window size of shared memory (e.g., 16 MB) that is the same preset window size as local memory. Another example of an error includes the case where a pre-defined register consumption per-CTA parameter will be exceeded by the TMD 322 if/when the TMD 322 is executed. Another example of an error includes the case where a throttled local memory size parameter or an SM count parameter of the TMD 322 is/are not as restrictive as a non-throttled local memory size parameter or a non-throttled SM count parameter, respectively, of TMD 322.

If, at step 512, the error checker 330 determines that there are errors associated with the TMD 322, then the method 500 proceeds to step 514 and an error is returned. Otherwise, the method 500 proceeds to step 516, where the TMD 322 is scheduled by the task/work unit 207 based on the scheduling parameters 410. At step 518, one or more CTAs are launched to execute the TMD 322 on the GPCs 208. During execution of the CTAs, the processing tasks are performed based on the execution parameters 515 and the CTA state 520 is maintained during execution of the CTAs.

In some cases, the error checker 330 may be configured to error check the TMD 322 while it is executing. One example of an execution error includes the case where a signaling PCAS (posted compare and swap) is received that attempts to invalidate the TMD 322 when the TMD 322 is in an active, executing state. Another example of an execution error includes the case where the TMD 322 is invalidated when the TMD 322 includes entries in the vspan table 310. Yet another example of an execution error includes the case where a non-signaling PCAS is received and the vspan table 310 is full.

At step 520, and upon one or more CTAs completing in execution, the TMD 322 is deallocated.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of error-checking a compute task, the method comprising:
   receiving a pointer to a task metadata structure that is associated with a compute task, wherein the task metadata structure includes a plurality of execution parameters that includes a first execution parameter that indicates a starting address of a program to be executed for the task metadata structure;
   storing the pointer in a scheduler table;
   determining that the task metadata structure is ready for execution;
   retrieving the pointer from the scheduler table to schedule the compute task for execution;
   after retrieving the pointer and prior to launching one or more cooperative thread arrays, determining via an error-check procedure that there are no errors associated with the task metadata structure, wherein the error-check procedure comprises reading configuration data and comparing the configuration data against one or more parameters included in the task metadata structure; and
   launching the one or more cooperative thread arrays to execute the task metadata structure.

2. The method of claim 1, wherein the task metadata structure includes initialization parameters that configure a streaming multiprocessor to execute at least one of the one or more cooperative thread arrays, and scheduling parameters that control the scheduling of the compute task.

3. The method of claim 2, wherein the one or more parameters comprise at least one of the initialization parameters, the scheduling parameters, and the execution parameters.

4. The method of claim 2, wherein the error-check procedure comprises detecting a signal that attempts to invalidate the compute task when the compute task is in an active, executing state.

5. The method of claim 2, wherein the error-check procedure returns an error when the initialization parameters specify a size of a shared memory to be used by the compute task that is the same as a size of a local memory to be used by the compute task.

6. The method of claim 2, wherein the error-check procedure returns an error when the initialization parameters specify a pre-defined register consumption per-CTA value that will be exceeded when the compute task is executed.

7. The method of claim 2, wherein the error-check procedure returns an error when the initialization parameters specify a throttled local memory size value that exceeds a non-throttled local memory size value, or when the initialization parameters specify a throttled shared memory count value that exceeds a non-throttled shared memory count value, wherein a number of threads not exceeding a maximum number may concurrently access the throttled local memory and throttled shared memory.

8. The method of claim 2, wherein the scheduling parameters include a bit indicating whether the task metadata structure comprises a grid task metadata structure or a queue task metadata structure, a fixed number of cooperative thread arrays being launched to execute the grid task metadata structure, and a variable number of cooperative thread arrays being launched to execute the queue task metadata structure.

9. The method of claim 2, wherein the initialization parameters include one or more bits indicating whether one or more caches included in a plurality of caches are to be invalidated when the one or more cooperative thread arrays are launched.

10. The method of claim 2, wherein the initialization parameters include a bit indicating whether a constant buffer bind is valid.

11. The method of claim 2, wherein the initialization parameters include a bit indicating whether data from a constant buffer is invalidated in a cache before the one or more cooperative thread arrays are launched.

12. The method of claim 1, wherein the task metadata structure further comprises cooperative thread array state associated with the one or more cooperative thread arrays.

13. The method of claim 12, wherein a queue is associated with the task metadata structure, the queue stores data that is related to the compute task and is to be processed by the one or more cooperative thread arrays, and the cooperative thread array state includes one or more pointers to entries within the queue.

14. The method of claim 1, wherein the task metadata structure is part of a linked list of different task metadata structures having similar execution priority.

15. The method of claim 14, wherein the pointer comprises either a head pointer or a tail pointer for the linked list.

16. A non-transitory computer-readable storage medium storing instructions that, when executed by a processor, cause the processor to error-check a compute task, by performing the steps of:
receiving a pointer to a task metadata structure that is associated with a compute task, wherein the task metadata structure includes a plurality of execution parameters that includes a first execution parameter that indicates a starting address of a program to be executed for the task metadata structure;
storing the pointer in a scheduler table;
determining that the task metadata structure is ready for execution;
retrieving the pointer from the scheduler table to schedule the compute task for execution;
after retrieving the pointer and prior to launching one or more cooperative thread arrays, determining via an error-check procedure that there are no errors associated with the task metadata structure, wherein the error-check procedure comprises reading configuration data and comparing the configuration data against one or more parameters included in the task metadata structure; and
launching the one or more cooperative thread arrays to execute the task metadata structure.

17. The non-transitory computer-readable storage medium of claim 16, wherein the task metadata structure includes initialization parameters that configure a streaming multiprocessor to execute at least one of the one or more cooperative thread arrays, and scheduling parameters that control the scheduling of the compute task.

18. A system for error-checking compute tasks, the system comprising:
a memory that is configured to store a task metadata structure corresponding a compute task; and
a multi-threaded processor that is configured to:
receive a pointer to a task metadata structure that is associated with a compute task, wherein the task metadata structure includes a plurality of execution parameters that includes a first execution parameter that indicates a starting address of a program to be executed for the task metadata structure;
store the pointer in a scheduler table;
determine that the task metadata structure is ready for execution;
retrieve the pointer from the scheduler table to schedule the compute task for execution;
after retrieving the pointer and prior to launching one or more cooperative thread arrays, determine via an error-check procedure that there are no errors associated with the task metadata structure, wherein the error-check procedure comprises reading configuration data and comparing the configuration data against one or more parameters included in the task metadata structure; and
launch the one or more cooperative thread arrays to execute the task metadata structure.

19. The system of claim 18, wherein the task metadata structure includes initialization parameters that configure a streaming multiprocessor to execute at least one of the one or more cooperative thread arrays, and scheduling parameters that control the scheduling of the compute task.

20. The system of claim 19, wherein the one or more parameters comprise at least one of the initialization parameters, the scheduling parameters, and the execution parameters.

21. The system of claim 19, wherein the error-check procedure comprises detecting a signal that attempts to invalidate the compute task when the compute task is in an active, executing state.

22. The system of claim 19, wherein the error-check procedure returns an error when the initialization parameters specify a size of a shared memory to be used by the compute task that is the same as a size of a local memory to be used by the compute task.

23. The system of claim 19, wherein the error-check procedure returns an error when the initialization parameters specify a pre-defined register consumption per-CTA value that will be exceeded when the compute task is executed.

24. The system of claim 19, wherein the error-check procedure returns an error when the initialization parameters specify a throttled local memory size value that exceeds a non-throttled local memory size value, or when the initialization parameters specify a throttled shared memory count value that exceeds a non-throttled shared memory count value, wherein a number of threads not exceeding a maximum number may concurrently access the throttled local memory and throttled shared memory.

\* \* \* \* \*